United States Patent
Huotari et al.

(10) Patent No.: US 9,635,485 B2
(45) Date of Patent: Apr. 25, 2017

(54) SETTING UP COMMUNICATION SESSIONS (75) Inventors: Seppo Huotari, Espoo (FI); Simo Hyytia, Espoo (FI); Timo Eloranta, Helsinki (FI); Olli Pulkkinen, Espoo (FI); Markku Vimpari, Oulu (FI); Kirsi Rotsten, Nurmijarvi (FI)

(73) Assignee: Nokia Technologies Oy, Espoo (FI)

(*) Notice: Subject to any disclaimer, the term of this patent is extended or adjusted under 35 U.S.C. 154(b) by 2453 days.

(21) Appl. No.: 10/732,540

(22) Filed: Dec. 11, 2003

(65) Prior Publication Data

US 2005/0041578 A1    Feb. 24, 2005

(30) Foreign Application Priority Data

Aug. 18, 2003 (GB) .................................. 0319630.4

(51) Int. Cl.
*H04W 4/00* (2009.01)
*H04L 29/06* (2006.01)
*H04W 40/00* (2009.01)

(52) U.S. Cl.
CPC .......... *H04W 4/00* (2013.01); *H04L 65/1006* (2013.01); *H04L 65/4061* (2013.01); *H04L 69/24* (2013.01); *H04L 65/1016* (2013.01); *H04W 40/00* (2013.01)

(58) Field of Classification Search
CPC ... H04W 4/10; H04W 76/005; H04W 72/044; H04W 76/02
USPC ........................................ 709/221, 222, 228
See application file for complete search history.

(56) References Cited

U.S. PATENT DOCUMENTS

| | | | | |
|---|---|---|---|---|
| 5,764,235 A | * | 6/1998 | Hunt ................... | G06F 17/2258 345/428 |
| 5,999,977 A | * | 12/1999 | Riddle ................ | H04L 12/1827 348/E7.083 |
| 6,044,403 A | * | 3/2000 | Gerszberg ............... | H04L 29/06 709/217 |
| 6,219,551 B1 | * | 4/2001 | Hentila ................ | H04Q 3/0029 379/221.08 |

(Continued)

FOREIGN PATENT DOCUMENTS

| | | |
|---|---|---|
| JP | 2000-092152 | 3/2000 |
| JP | 2001197127 A | 7/2001 |

(Continued)

OTHER PUBLICATIONS

Rosenberg, J. et al., SIP:Session Initiation Protocol, RFC 3261, Jun. 2002, pp. 1-269.*

(Continued)

*Primary Examiner* — B. Tiv
(74) *Attorney, Agent, or Firm* — Mintz Levin Cohn Ferris Glovsky and Popeo, P.C.

(57) ABSTRACT

A method for setting up data sessions in a communication system is provided. The method comprises registering at least one user equipment with a service provider where after information about media capabilities is communicated between the at least one user equipment and the service provider and then stored. The method comprises further sending a request for a data session with at least one user equipment and using the stored information when setting up the requested data session. A communication system, an application server and a user equipment configured to operate accordingly are also provided.

24 Claims, 5 Drawing Sheets

(56) References Cited

U.S. PATENT DOCUMENTS

| | | | | |
|---|---|---|---|---|
| 6,516,350 B1* | 2/2003 | Lumelsky | H04L 29/06 | 709/224 |
| 6,564,261 B1* | 5/2003 | Gudjonsson | H04L 12/1818 | 370/261 |
| 6,636,721 B2* | 10/2003 | Threadgill | H04B 7/18506 | 455/12.1 |
| 6,661,881 B1* | 12/2003 | Garland | H04M 3/382 | 379/106.09 |
| 6,728,263 B2* | 4/2004 | Joy | H04L 29/06 | 370/395.21 |
| 6,763,226 B1* | 7/2004 | McZeal, Jr. | H04B 7/18595 | 370/354 |
| 6,789,120 B1* | 9/2004 | Lee | H04L 29/06027 | 370/352 |
| 6,914,897 B1* | 7/2005 | Schuster | H04H 20/82 | 370/338 |
| 6,950,101 B2* | 9/2005 | Hunt | G06F 17/2258 | 345/428 |
| 6,973,299 B2* | 12/2005 | Apfel | H04M 1/274516 | 379/266.1 |
| 6,977,911 B1* | 12/2005 | Geen | H04L 29/06027 | 370/328 |
| 7,010,727 B1* | 3/2006 | Stucker | | 714/52 |
| 7,031,703 B1* | 4/2006 | Graf | H04W 28/24 | 455/432.1 |
| 7,131,003 B2* | 10/2006 | Lord | H04L 63/0823 | 713/155 |
| 7,151,753 B2* | 12/2006 | Chaney et al. | | 370/261 |
| 7,170,863 B1* | 1/2007 | Denman | H04W 4/10 | 370/260 |
| 7,213,143 B1* | 5/2007 | Watson | H04L 63/0428 | 713/151 |
| 7,801,953 B1* | 9/2010 | Denman | H04W 4/10 | 370/260 |
| 7,933,225 B2* | 4/2011 | Chow | H04L 12/66 | 370/259 |
| 7,948,954 B1* | 5/2011 | Chow | H04L 12/66 | 370/338 |
| 8,179,820 B2* | 5/2012 | Chow | H04L 12/66 | 370/259 |
| 2001/0049790 A1* | 12/2001 | Faccin | H04L 63/104 | 713/185 |
| 2002/0002616 A1* | 1/2002 | Lim | H04L 12/5695 | 709/227 |
| 2002/0132635 A1* | 9/2002 | Girard | H04M 1/72519 | 455/552.1 |
| 2003/0013434 A1* | 1/2003 | Rosenberg | G06Q 20/14 | 455/414.1 |
| 2003/0058827 A1* | 3/2003 | Chow | H04L 12/66 | 370/338 |
| 2003/0072299 A1* | 4/2003 | Hunt | G06F 17/2258 | 370/352 |
| 2003/0083894 A1* | 5/2003 | Bell | G07B 17/0008 | 705/401 |
| 2003/0142641 A1* | 7/2003 | Sumner | H04L 63/0428 | 370/328 |
| 2003/0148779 A1* | 8/2003 | Aravamudan | H04L 29/06 | 455/519 |
| 2003/0154243 A1* | 8/2003 | Crockett | H04L 63/08 | 709/203 |
| 2003/0158901 A1* | 8/2003 | Ludwig | G06Q 10/10 | 709/205 |
| 2003/0200337 A1* | 10/2003 | Jabri | H04L 29/06 | 709/246 |
| 2003/0227871 A1* | 12/2003 | Hsu | H04L 12/5695 | 370/230 |
| 2003/0227911 A1* | 12/2003 | Trossen | | 370/352 |
| 2004/0008632 A1* | 1/2004 | Hsu | H04L 12/5695 | 370/252 |
| 2004/0032843 A1* | 2/2004 | Schaefer | H04W 84/08 | 370/338 |
| 2004/0037267 A1* | 2/2004 | Bennett | H04L 12/2602 | 370/352 |
| 2004/0047354 A1* | 3/2004 | Slater | H04L 41/0896 | 370/400 |
| 2004/0085949 A1* | 5/2004 | Partanen | H04L 12/5695 | 370/352 |
| 2004/0105428 A1* | 6/2004 | Hukkanen | H04W 28/08 | 370/352 |
| 2004/0153667 A1* | 8/2004 | Kastelewicz | H04L 12/06 | 726/9 |
| 2004/0192364 A1* | 9/2004 | Ranalli | H04L 29/12066 | 455/517 |
| 2004/0249949 A1* | 12/2004 | Gourraud | H04W 4/10 | 709/227 |
| 2004/0264470 A1* | 12/2004 | Sirbu | H04L 69/24 | 370/395.2 |
| 2004/0266468 A1* | 12/2004 | Brown | H04M 1/72519 | 455/518 |
| 2005/0027716 A1* | 2/2005 | Apfel | H04M 1/274516 | |
| 2005/0032538 A1* | 2/2005 | Noel | H04W 76/005 | 455/518 |
| 2005/0041578 A1* | 2/2005 | Huotari | H04W 4/00 | 370/229 |
| 2005/0041617 A1* | 2/2005 | Huotari | H04L 12/5695 | 370/328 |
| 2005/0143056 A1* | 6/2005 | Iyer | H04W 76/005 | 455/416 |
| 2005/0262198 A1* | 11/2005 | Leppanen | H04L 29/06 | 709/204 |
| 2006/0052087 A1* | 3/2006 | Tuunanen | H04L 12/58 | 455/414.1 |
| 2007/0026862 A1* | 2/2007 | Hicks, III | H04W 36/30 | 455/436 |
| 2007/0237134 A1* | 10/2007 | Bergenlid | H04L 29/06 | 370/352 |
| 2008/0075055 A1* | 3/2008 | Chow | H04L 12/66 | 370/338 |

FOREIGN PATENT DOCUMENTS

| | | |
|---|---|---|
| JP | 2003-092776 | 3/2003 |
| WO | WO 00/35126 | 6/2000 |
| WO | WO-0169950 A1 | 9/2001 |
| WO | 02/052825 | 7/2002 |
| WO | WO 02/052825 A1 | 7/2002 |

OTHER PUBLICATIONS

Russian Office Action, Russian Appln. No. 2006108559/09(009315), Issued: Aug. 5, 2008, pp. 1-2, English Translation: pp. 1-2.

EPO European Search Report dated Dec. 11, 2009, issued in connection with counterpart EP application No. 04744213.2-1244.

Notification of Reason for Rejection dated Feb. 2, 2010, issued by the Japanese Patent Office in connection with counterpart Japanese patent application No. 2006-523694.

\* cited by examiner

SETTING UP COMMUNICATION SESSIONS

BACKGROUND OF THE INVENTION

Field of the Invention

The invention relates to communication systems and in particular to setting up communication sessions associated with time critical services in communication systems that facilitate packet data communication sessions for users thereof.

Description of the Related Art

A communication system can be seen as a facility that enables communication sessions between two or more entities such as user equipment and/or other nodes associated with the communication system. The communication may comprise, for example, communication of voice, data, multimedia, and so on. A session may, for example, be a telephone call between users or multi-way conference session, or a communication session between a user equipment and an application server (AS), for example a service provider server. The establishment of these sessions generally enables a user to be provided with various services.

A communication system typically operates in accordance with a given standard or specification which sets out what the various entities associated with the communication system are permitted to do and how that should be achieved. For example, the standard or specification may define if the user, or more precisely, user equipment is provided with a circuit switched service and/or a packet switched service. Communication protocols and/or parameters which shall be used for the connection may also be defined. In other words, a specific set of "rules" on which the communication can be based on needs to be defined to enable communication by means of the system.

Communication systems providing wireless communication for user equipment are known. An example of the wireless systems is the public land mobile network (PLMN). The PLMNs are typically based on cellular technology. In cellular systems, a base transceiver station (BTS) or similar access entity serves wireless user equipment (UE) known also as mobile stations (MS) via a wireless interface between these entities. The communication on the wireless interface between the user equipment and the elements of the communication network can be based on an appropriate communication protocol. The operation of the base station apparatus and other apparatus required for the communication can be controlled by one or several control entities. The various control entities may be interconnected.

One or more gateway nodes may also be provided for connecting the cellular network to other networks e.g. to a public switched telephone network (PSTN) and/or other communication networks such as an IP (Internet Protocol) and/or other packet switched data networks. In such an arrangement the mobile communications network provides an access network enabling a user with a wireless user equipment to access external networks, hosts, or services offered by specific service providers. The access point or gateway node of the mobile communication network then provides further access to an external network or an external host. For example, if the requested service is provided by a service provider located in other network, the service request is routed via the gateway to the service provider. The routing may be based on definitions in the mobile subscriber data stored by a mobile network operator.

An example of the services that may be offered for users such as the subscribers to communication systems are the so-called multimedia services. Some of the communication systems enabled to offer multimedia services are known as Internet Protocol (IP) Multimedia networks. IP Multimedia (IM) functionalities can be provided by means of an IP Multimedia Core Network (CN) subsystem, or briefly IP Multimedia subsystem (IMS). The IMS includes various network entities for the provision of the multimedia services. The IMS services are intended to offer, among other services, IP connections between mobile user equipment.

The third generation partnership project (3GPP) has defined use of the general packet radio service (GPRS) for the provision of the IMS services, and therefore this will be used in the following as an example of a possible backbone communication network enabling the IMS services. The exemplifying general packet radio service (GPRS) operation environment comprises one or more sub-network service areas that are interconnected by a GPRS backbone network. A sub-network comprises a number of packet data service nodes (SN). In this application the service nodes will be referred to as serving GPRS support nodes (SGSN). Each of the SGSNs is connected to at least one mobile communication network, typically to base station systems. The connection is typically by way of radio network controllers (RNC) or other access system controllers such as base stations controllers (BSC) in such a way that packet service can be provided for mobile user equipment via several base stations. The intermediate mobile communication network provides packet-switched data transmission between a support node and mobile user equipment. Different sub-networks are in turn connected to an external data network, e.g. to a public switched data network (PSPDN), via gateway GPRS support nodes (GGSN). The GPRS services thus allow the provision of packet data transmission between mobile data terminals and external data networks.

In such a network, a packet data session is established to carry traffic flows over the network. Such a packet data session is often referred as a packet data protocol (PDP) context. A PDP context may include a radio access bearer provided between the user equipment, the radio network controller and the SGSN, and switched packet data channels provided between the serving GPRS support node and the gateway GPRS support node.

A data communication session between the user equipment and other party would then be carried on the established PDP context. Each PDP context can carry more than one traffic flow, but all traffic flows within one particular PDP context are treated the same way as regards their transmission across the network. The PDP context treatment requirement is based on PDP context treatment attributes associated with the traffic flows, for example quality of service and/or charging attributes.

The Third Generation Partnership Project (3GPP) has also defined a reference architecture for the third generation (3G) core network, which will provide the users of user equipment with access to the multimedia services. This core network is divided into three principal domains. These are the Circuit Switched (CS) domain, the Packet Switched (PS) domain, and the Internet Protocol Multimedia (IM) domain. The latter of these, the IM domain, is for ensuring that multimedia services are adequately managed.

The IM domain supports the Session Initiation Protocol (SIP) as developed by the Internet Engineering Task Force (IETF). Session Initiation Protocol (SIP) is an application-layer control protocol for creating, modifying, and terminating sessions with one or more participants (endpoints). SIP was generally developed to allow for initiating a session between two or more endpoints in the Internet by making these endpoints aware of the session semantics. A user connected to a SIP based communication system may communicate with various entities of the communication system based on standardized SIP messages. User equipment or users that run certain applications on the user equipment are registered with the SIP backbone so that an invitation to a particular session can be correctly delivered to these endpoints. To achieve this, SIP provides a registration mechanism for devices and users, and it applies mechanisms such as location servers and registrars to route the session invitations appropriately. Examples of the possible sessions that may be provided by means of SIP signaling include Internet multimedia conferences, Internet telephone calls, and multimedia distribution.

It is expected that various types of services are to be provided by means of different Application Servers (AS) over IMS systems. Some of these services may be time critical. An example of the time critical services that may be provided over the IMS are the so-called direct voice communication services. A more specific example of these is the Push-to-Talk over Celluar (PoC) service, also known as PTT, Push-To-Talk service. The direct voice communication services arc intended to use the capabilities of the IP Multimedia Subsystem (IMS) for enabling IP connections for mobile user equipment and other parties of the communications, for example other mobile user equipment or entities associated with the network. The service allows a user to engage in immediate communication with one or more other users.

In PoC services communication between a user equipment and a PoC application server occurs on a one-way communications media. A user may open the communications media by simply pushing a tangent key, for example a button on the keyboard of a user equipment. The push to talk button may be a specific button or then any appropriate key of the keyboard. While a user speaks, the other user or users may listen. Bi-directional communication can be offered since all parties of the communications session may similarly communicate voice data with the PoC application server. The turns to speak are requested by pressing the push-to-talk button. The turns may be granted for example on a first come first served basis or based on priorities; hence the name "push to talk." Users can join the group session they wish to talk to and then press the tangent key to start talking.

In conventional session establishment procedures media capabilities of a user equipment are negotiated during the session set-up procedure. For example, PoC communication between two user equipments (one-to-one communications) or attachment to a PoC group in one-to-many communications requires an SIP session on the control plane. This time alone is fairly long, especially when considering the needs of the time-critical services. The push-to-talk type instant services, on the other hand, are real-time services by their nature. Therefore the user plane connection should be ready with no unnecessary delay after the special tangent or another indication is given to an equipment that the user thereof wants to speak with another party. However, due to the nature of the set-up procedures required for a PDP context, it may take a while until a proper data connection is provided from the request to have one. For example, the PDP context activation together with radio access bearer establishment time in 3GPP release 5 compliant IMS network takes typically more than three seconds.

Because of this, there may be no time for proper end-to-end media capability negotiations, as the media capability negotiations may take too long to be done in the beginning of a session. This may have various disadvantageous effects. For example, a problem is how to provide adequate codec settings from the beginning of a session. If adequate codec information is not available, the bursts may use unnecessary low codec for the type of communications required. Other examples of possible capability information that may need to be negotiated is given in the detailed description.

Therefore it might be advantageous if the capability negotiations could be properly accomplished for the set-up. However, if even more time is required for the set-up, it is possible that users become frustrated and do not wait long enough so that the service they requested could be provided for them. A too long waiting time might also be considered as inadequate from the service level point of view. If a caller has to wait for too long for the start-to-talk-indication, he/she might assume that the request was not successful. The caller may then even repress the tangent. The repressing causes a new SIP session establishment procedure, thus consuming network resources and delaying the session set-up further.

SUMMARY OF THE INVENTION

According to one embodiment of the invention, there is provided a method for setting up data sessions. The method comprises registering at least one user equipment with a service provider where after information about media capabilities is communicated between the at least one user equipment and the service provider and then stored. The method comprises further sending a request for a data session with at least one user equipment and using the stored information when setting up the requested data session.

According to another embodiment of the invention there is provided a communication system configured for providing services for users thereof. The communication system comprises a communication network for providing at least one user equipment with access to at least one data network, a data network connected to the communication network, and an application server connected to the data network. The application server is configured to communicate information about media capabilities with at least one user equipment before a data session with the user equipment is requested, to store information about media capabilities in a storage, and to use information from the storage when setting up a requested data session.

According to yet another embodiment of the invention there is provided an application server for provision of services for user equipment connected to a communication network. The application server is connected to a data network. The application server is configured to communicate information about media capabilities with at least one user equipment before a data session with the at least one user equipment is requested, to store information about media capabilities in a storage and to use information from the storage when setting up a requested data session.

According to yet another embodiment of the invention there is provided a user equipment configured to connect to a communication network. The user equipment is configured to communicate information about media capabilities with an application server connected to a data network via the communication network and the data network before a request for a data session with the user equipment is sent to the application server.

The embodiments of the invention may provide various advantages. The time which is required for setting up a speech or other connection with appropriate media capabilities may be decreased in certain applications. In certain embodiments the waiting time required for the provision of requested sessions for time critical services may be made shorter. Unnecessary repetition of session requests may be avoided. This may save network and user equipment resources. The embodiments may improve the usability of services, especially time critical services.

BRIEF DESCRIPTION OF THE DRAWINGS

For better understanding of the invention, reference will now be made by way of example to the accompanying drawings in which.

DETAILED DESCRIPTION OF THE PREFERRED EMBODIMENTS

Certain embodiments of the present invention will be described by way of example, with reference to the exemplifying architecture of a third generation (3G) mobile communications system. However, it will be understood that certain embodiments may be applied to any other suitable form of network. A mobile communication system is typically arranged to serve a plurality of mobile user equipment usually via a wireless interface between the user equipment and base station of the communication system. The mobile communication system may logically be divided between a radio access network (RAN) and a core network (CN).

Figure 1:
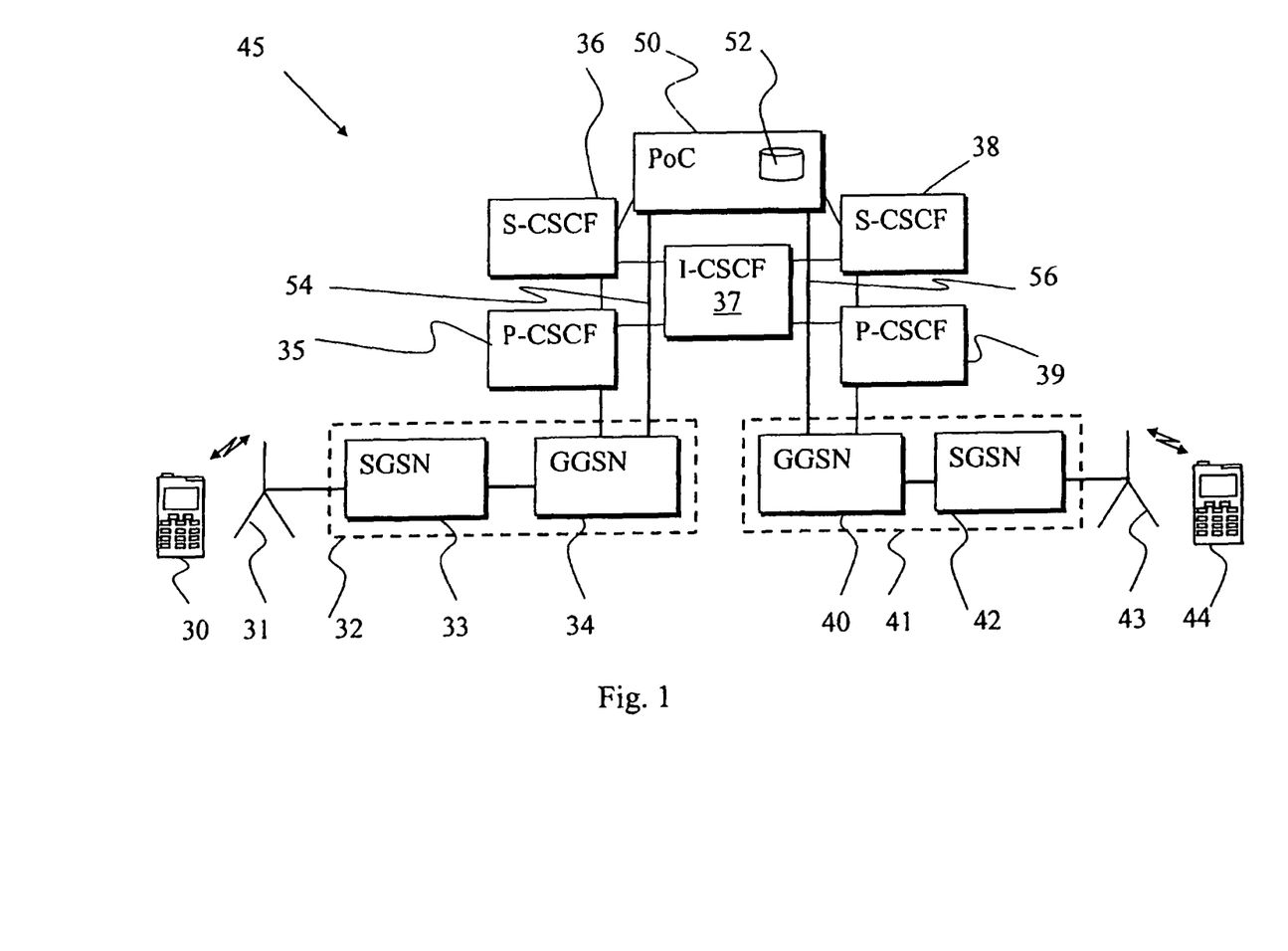
FIG. 1 shows a communication system wherein the invention may be embodied.

Reference is made to FIG. 1 which shows an example of a network architecture wherein the invention may be embodied. FIG. 1 shows an IP Multimedia Network 45 for offering IP multimedia services for IP Multimedia Network subscribers. IP Multimedia (TM) functionalities can be provided by means of a Core Network (CN) subsystem including various entities for the provision of the service.

Base stations 31 and 43 are arranged to transmit signals to and receive signals from mobile user equipment 30 and 44 of mobile users, i.e. subscribers, via a wireless interface. Correspondingly, each of the mobile user equipment is able to transmit signals to and receive signals from the base station via the wireless interface. In the simplified presentation of FIG. 1, the base stations 31 and 43 belong to the respective radio access networks (RAN). In the shown arrangement, each of the user equipment 30 and 44 may access the IMS network 45 via the two access networks associated with base stations 31 and 43, respectively. It shall be appreciated that, although, for clarity, FIG. 1 shows the base stations of only two radio access networks, a typical mobile communication network usually includes a number of radio access networks.

The 3G radio access network (RAN) is typically controlled by appropriate radio network controller (RNC). This controller is not shown in order to enhance clarity. A controller may be assigned for each base station or a controller can control a plurality of base stations. Solutions wherein controllers are provided both in individual base stations and in the radio access network level for controlling a plurality of base stations are also known. It shall thus be appreciated that the name, location and number of the network controllers depends on the system.

The mobile user may use any appropriate mobile device adapted for Internet Protocol (IP) communication to connect the network. For example, the mobile user may access the cellular network by means of a Personal Computer (PC), Personal Data Assistant (PDA), mobile station (MS) and so on. The following examples are described in the context of mobile stations.

One skilled in the art is familiar with the features and operation of a typical mobile station. Thus, a detailed explanation of these features is not necessary. It is sufficient to note that the user may use a mobile station for tasks such as for making and receiving phone calls, for receiving and sending data from and to the network and for experiencing, e.g. multimedia content. A mobile station is typically provided with processor and memory means for accomplishing these tasks. A mobile station may include antenna means for wirelessly receiving and transmitting signals from and to base stations of the mobile communication network. A mobile station may also be provided with a display for displaying images and other graphical information for the user of the mobile user equipment. Speaker means may are also be provided. The operation of a mobile station may be controlled by means of an appropriate user interface such as control buttons, voice commands and so on.

The mobile stations 30 and 44 are enabled to use of the Push-to-talk type services. A tangent function that may be required by the Push-to-talk services can be provided by one of the buttons on the normal keypad of the mobile stations 30 and 44, or by a specific tangent key, for example with a tangent known from the "Walkie-Talkie" devices. Voice activation may also be used. In this case a detected sound may be used for triggering the set-up of the session for transmission of speech or other data. Instead of pressing a key, the user may also activate the service by means of an appropriate menu selection. The manner how a mobile station may activate the service is an implementation issue, and will therefore not be described in any more detail.

It shall be appreciated that although only two mobile stations are shown in FIG. 1 for clarity, a number of mobile stations may be in simultaneous communication with each base station of the mobile communication system. A mobile station may also have several simultaneous sessions, for example a number of SIP sessions and activated PDP contexts. The user may also have a phone call and be simultaneously connected to at least one other service.

The core network (CN) entities typically include various control entities and gateways for enabling the communication via a number of radio access networks and also for interfacing a single communication system with one or more communication system such as with other cellular systems and/or fixed line communication systems. In FIG. 1 serving GPRS support nodes 33 and 42 and gateway GPRS support nodes 34 and 40 are for provision of support for GPRS services 32 and 41, respectively, in the network.

The radio access network controller is typically connected to an appropriate core network entity or entities such as, but not limited to, the serving general packet radio service support nodes (SGSN) 33 and 42. Although not shown, each SGSN typically has access to designated subscriber database configured for storing information associated with the subscription of the respective user equipment.

A user equipment within the radio access network may communicate with a radio network 5 controller via radio network channels which are typically referred to as radio bearers (RB). Each user equipment may have one or more radio network channel open at any one time with the radio network controller. The radio access network controller is in communication with the serving GPRS support node via an appropriate interface, for example on an Iu interface.

The serving GPRS support node, in turn, typically communicates with a gateway GPRS support node via the GPRS backbone network 32.41. This interface is commonly a switched packet data interface. The serving GPRS support node and/or the gateway GPRS support node are for provision of support for GPRS services in the network.

Overall communication between user equipment in an access entity and a gateway GPRS Support node is generally provided by a packet data protocol (PDP) context. Each PDP context usually provides a communication pathway between a particular user equipment and the gateway GPRS support node and, once established, can typically carry multiple flows. Each flow normally represents, for example, a particular service and/or a media component of a particular service. The PDP context therefore often represents a logical communication pathway for one or more flow across the network. To implement the PDP context between user equipment and the serving GPRS support node, radio access bearers (RAB) need to be established which commonly allow for data transfer for the user equipment. The implementation of these logical and physical channels is known to those skilled in the art and is therefore not discussed further herein.

The user equipment 30 and 44 may connect, via the GPRS network, to application servers that are generally connected to the IMS. In FIG. 1 such an application server is provided by a push-to-talk over cellular (PoC) services server 50. The server 50 is for providing push-to-talk over cellular (PoC) services over the IMS network 45. The push-to-talk service is an example of the so-called direct voice communication services. Users who wish to use the PoC service may need to subscribe to an appropriate PoC server. The registration to the PoC service after the registration to the IMS may then be done by the IMS by means of appropriate third party registration procedure. A PoC server is preferably provided with appropriate memory means of storing information associated with the capabilities of the user equipment registered with it. Thus FIG. 1 shows memory means 52 of the PoC application server 50.

The direct voice communication services are intended to use the capabilities of the GPRS backbone and the control functions of the Multimedia Subsystem (IMS) for enabling IP connections for the mobile stations 30 and 44. The PoC application server may be operated by the operator of the IMS system, or by a third party service provider. A more detailed explanation of how the service allows the user of the mobile station 30 (A-party) to engage in immediate communication with the user of the mobile station 44 (B-party) is given later in this description.

A user may open the communication session, for example by simply pressing a specific button on the mobile station 30. While the user of the mobile station 30 speaks, the user of the mobile station 44 listens. The user of the mobile station 44 may then reply in similar manner.

The communication systems have developed such that services may be provided for the user equipment by means of various functions of the network that are handled by network entities known as servers. For example, in the current third generation (3G) wireless multimedia network architectures it is assumed that several different servers are used for handling different functions. These include functions such as the call session control functions (CSCFs). The call session control functions may be divided into various categories such as a proxy call session control function (P-CSCF), interrogating call session control function (I-CSCF). and serving call session control function (S-CSCF). A user who wishes to use services provided by an application server via the IMS system may need to register with a serving control entity. The serving call session control function (S-CSCF) may form in the 3G IMS arrangements the entity a user needs to be registered with in order to be able to request for a service from the communication system.

It shall be appreciated that similar function may be referred to in different systems with different names. For example, in certain applications the CSCFs may be referenced to as the call state control functions.

Communication systems may be arranged such that a user who has been provided with required communication resources by the backbone network has to initiate the use of services by sending a request for the desired service over the communication system. For example, a user may request for a session, transaction or other type of communications from an appropriate network entity.

The signaling between the user equipment and the appropriate call state control functions is routed via the GPRS networks. The user plane session set-up signaling for the user equipment is routed via and controlled by the PoC application server 50, i.e. the PoC controls both the control plane and the user plane of the PoC user. It shall be appreciated that the control plane traffic between the PoC application server and the user equipment is routed via the IMS 45 while the user plane traffic between the user equipment and the PoC application server is routed from the GPRS system to the PoC application server on interfaces 54 and 56.

The embodiments are based on the realization that it might be advantageous if at least a portion of media capability negotiations could be performed for time critical services before the actual communication of data is to be activated. The media capability negotiations may be needed for communication of various capability information between a particular user equipment and the application server. Non-limiting examples of the user equipment specific information that may need to be provided for the application server include port information, i.e. to which port the application server shall send the media, information regarding the type and version of the user equipment, timer information, information about the supported codecs and modes, information about the supported optional features, and so on. The user equipment may also provide the application server with information regarding the capabilities of the wireless interface it has with the radio network. For example, information regarding the capacity and quality of the wireless interface, any quality of service restrictions and so on may be communicated to the application server. The user equipment may need to be provided with application server specific information such as information regarding the version of the server, supported optional features, possible timers, available services for the subscriber, prepaid or postpaid accounts, and so on.

The following will describe an embodiment wherein the capabilities of a user equipment are informed to an application server before the service offered by the application server is taken into use. In the embodiment the user equipment performs the media capability negotiation with the time-critical application server or a plurality of servers right after the initial registration to the IMS system.

Figure 2:
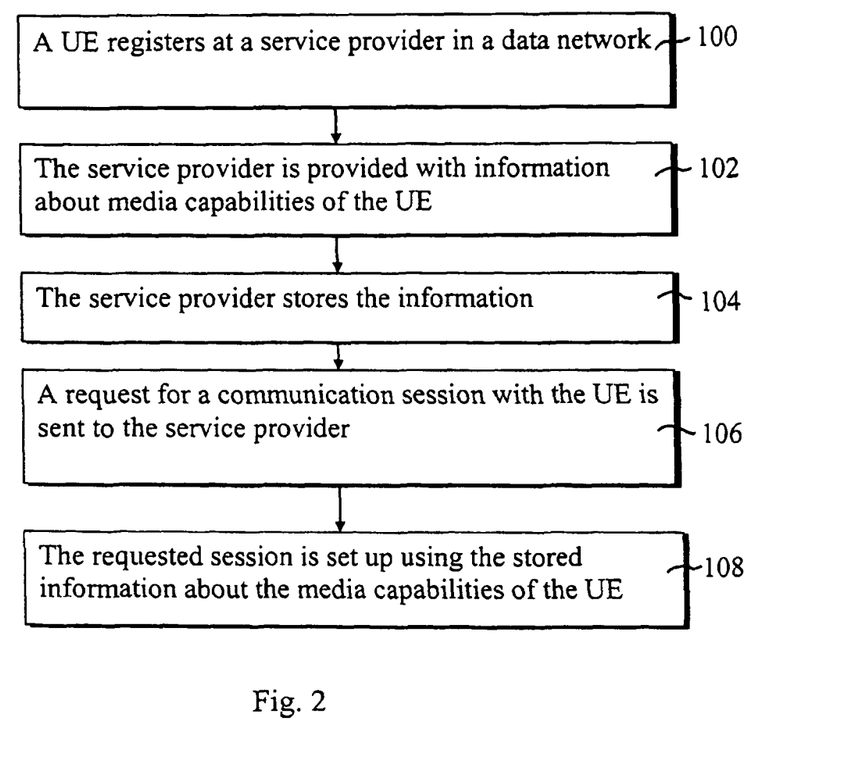
FIG. 2 is a flowchart illustrating the operation of one embodiment of the invention.

Referring now to FIG. 2, in step 100 a user equipment is registered at the desired service provider application server. In accordance with an embodiment a mobile station 44 is first registered with the IMS, for example, with the serving CSCF 38. After the mobile station 44 is successfully registered at the IMS, a third party registration of the mobile station 44 may then be carried out with the PoC application server 50. This may be done automatically for each user who has subscribed to the PoC services. Thus the user may not need to take any action at this stage. The third party registration may be provided by means of a SIP $3^{rd}$ party registration procedure between the IMS and the PoC application server.

The user equipment may then perform the media negotiation at step 102 with the application server right after the third party registration by the S-CSCF. The negotiation may be performed, e.g. by means of SIP INVITE, SIP MESSAGE, or SIP OPTION messages that are communicated between the user equipment and the application server, see also FIG. 3. When the capability information is received by the application server it stores it in a database thereof at step 104. In response to an A-parts' user equipment requesting at step 106 for a communication session with the user equipment registered at steps 100 to 104, the application server 50 may use the stored media capability information for setting up the requested session at step 108. Therefore further media capability negotiations can be avoided at this stage.

The media capabilities associated with the A-party user equipment may be included in the request for the session. Alternatively, the application server may use information stored in the database thereof also for the A-party user equipment.

Figure 3:
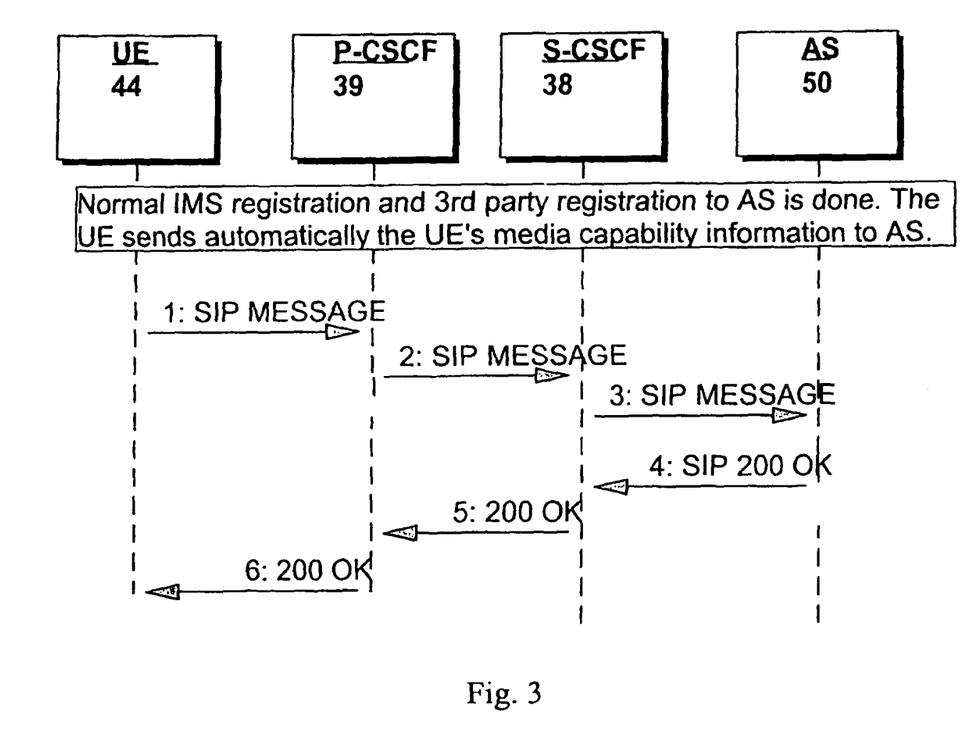
FIG. 3 shows a possible media capability negotiation procedure.

A reference is now also made to FIG. 3 showing a possible mechanism for the media capability negotiations. The PoC enabled user equipment 44 sends an appropriate SIP message 1 right after the PoC registration is done. The SIP MESSAGE 1 may carry the required capability information of the user equipment.

The PoC server 50 receives the capability information in SIP MESSAGE 3 and stores the information in a database 52 thereof. The user plane parameters of the B-party user equipment 44, for example port numbers, required for communication between the PoC application server and the B-party user equipment are thus made available for the PoC application server. A number of users maybe similarly registered with the PoC application server. The other user equipment may perform similar capability negotiations and therefore the parameters of a plurality of user equipment may be stored in the PoC application server. When all necessary information is available, the PoC application server may send the SIP 200 OK message 4 back to the user equipment 44. Upon receipt of the SIP 200 OK message 6, the user equipment knows that the capability information has been registered and that use of the services may be commenced whenever this is required.

Figure 4:
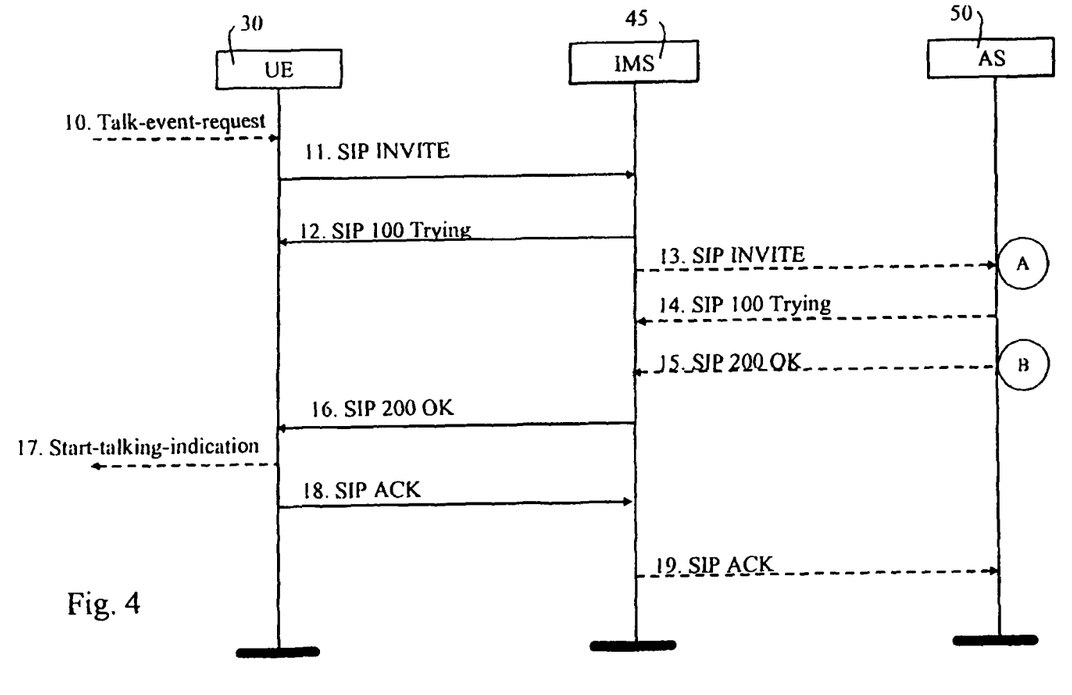
FIG. 4 shows a possible session set-up procedure for a calling user equipment.
Figure 5:
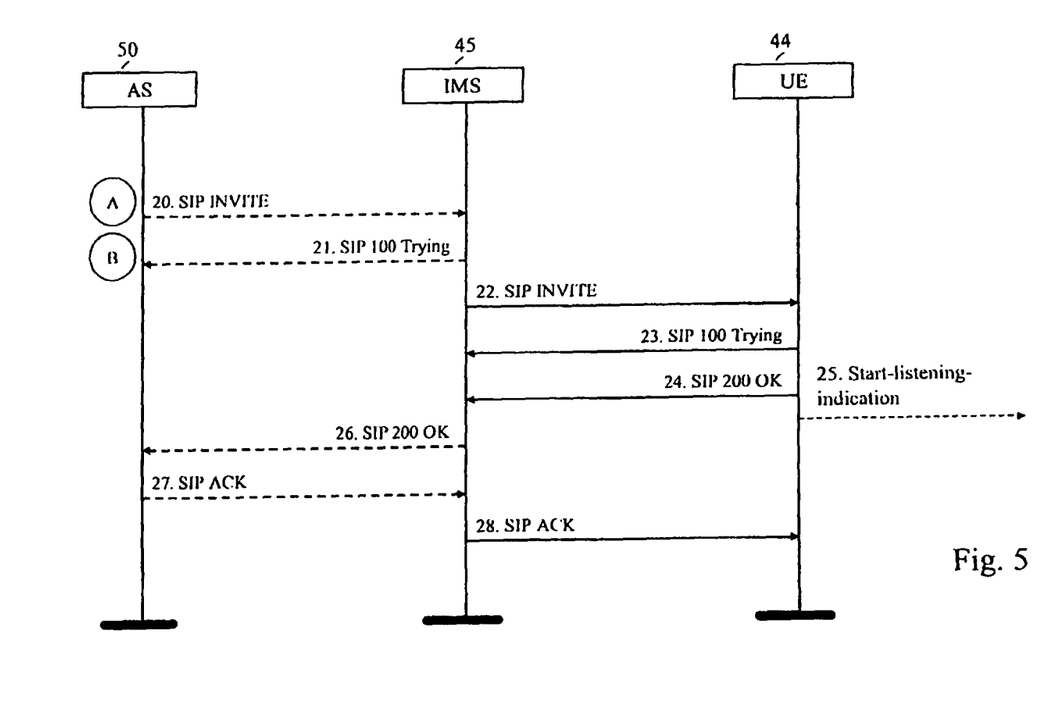
FIG. 5 shows a possible session set-up for a called user equipment.

FIG. 4 illustrates possible signaling between the user equipment 30 and a PoC application server 50 after the B-party user equipment 44 registered its media capabilities at the application server. FIG. 5 shows the messaging between the PoC application server 50 and the B-party user equipment 44. The circled characters A and B in FIGS. 4 and 5 show where the signaling flowcharts of FIGS. 4 and 5 may be mapped to each other to get a more complete illustration of the signaling for the activation procedure for a connection between the A and B party user equipment 30 and 44, respectively.

At step 10, the user gives an indication that he/she wishes to establish a speech connection with the B-party. The user equipment 30 may then send a SIP INVITE message 11 to the IMS 45 to be routed to the PoC application server 50 for requesting for the speech connection with the B-party. The IMS may send a SIP 100 TRYING message 12 back to the user equipment 30 in confirmation that it has received the request.

The IMS 45 forwards the SIP INVITE as message 13 to the PoC application server 50. Upon receipt of this message, the application server may send a SIP 100 TRYING message 14 back to the IMS in confirmation that it has received the request.

Once the application server receives confirmation from the 1 MS that it has received the request (see message 21 of FIG. 5), the application server may send SIP 200 OK message 15 to the IMS. This message may be sent even before the B-party user equipment 44 has received the request or any indication that such a request might be expected. The SIP 200 OK is then forwarded to the user equipment 30 in message 16. In response to receiving message 16, the user equipment 30 may then give an indication at step 17 to the user of the user equipment that he/she may start talking. The user equipment 30 may also acknowledge the OK message by sending a SIP ACK message 18 to the IMS. This message may then be forwarded to the PoC application server 50 as message 19.

As shown in FIG. 5, in response to receiving the SIP INVITE message 13 in FIG. 4, the PoC application server 50 may send a SIP INVITE message 20 to the IMS to be routed to the B-party user equipment 44. The EMS may send a SIP 100 TRYING message 21 back to the application server to confirm that it has received the message. The IMS 45 forwards the SIP INVITE as message 22 to the PoC enabled B-party user equipment 44. Upon receipt of this message, the B-party user equipment 44 may send a SIP 100 TRYING message 23 back to the IMS in confirmation that it has received the request.

Once the required processing is completed at the B-party user equipment 44 and the request can be fulfilled. SIP 200 OK message 24 is communicated to the IMS. The B-party user equipment 44 may also give a start listening indication to the user thereof at step 25. The B-party user may be provided with an indication of a coming PoC "talk" session just before talk burst from the A-party comes through.

The SIP 200 OK is forwarded from the IMS to the PoC application server 50 in message 26. The PoC application server 50 may acknowledge the OK message 26 by sending a SIP ACK message 27 to the IMS. This message may then be forwarded to the B-party user equipment 44 as message 28.

The early user equipment media capability negotiation may speed-up the session establishment. The information provided for the application server may be especially useful if any adaptation of the user plane connection between the two user equipment 30 and 44 is needed, for example due to different communication link characteristics. If the application server (or a plurality of application servers) is made aware of the media parameters beforehand, it may negotiate the parameters with the user equipment before the communications between the user equipment, for example before the first talk burst is communicated from one user equipment to the other in a PoC application. Negotiation of the capabilities, for example the codec capabilities, would not take time in the set-up of the actual communication session. A properly set codec mode may be used to ensure the quality of the speech connection. The application server may store the capability information for all user equipment registered with the application server.

In a further embodiment a user equipment may be provided with an "always-on session" with the application server. This procedure may be called for example as a "pre-session," "early session," or "always-on session" establishment; in such case the media capability negotiation is preferably performed during the establishment of the "always-on session" establishment. The user equipment may automatically request for an "always-on session" establishment after registration to an application server in step 100 of FIG. 2. For the purpose of facilitating a quick session set-up, the PDP context for the user may be activated and the required radio access bearers (RAB) may also be set up automatically in response to the registration with the application server. The pre-establishment of the PDP context may be performed by means of a SIP session for activating the PDP context before sending a request for a communication session or by means of another appropriate PDP-context activation procedure. The radio access hearer (RAB) setup may be done by means of an appropriate RAB assignment procedure. In order to provide adequate instant services for subscriber, the "always-on" session is preferably provided between the user equipment and the application server before any actual request for speech or other session is made. The already established communication session may then be used for communication between the user equipment and the application server.

The pre-established "always-on" session provides substantially instant communication between the end user and his/her home PoC application server. The communication may be transported from a user equipment to a PoC application server in response the user of the user equipment pressing a tangent key of the user equipment wherein the pressing of the tangent opens a speech connection to the PoC server. Since the PDP-context is already established, the communication request can be transported to the PoC application server by means of any appropriate signaling protocol. It shall be appreciated that this is an application level issue, and can be provided in various manners. The communication network standards, such as the 3GPP, are typically not set restricted in a particular protocol for this type of purposes. To give an example, Real-time transport protocol (RTP) or RTP control protocol (RTCP) may be used for the sending of the request. These protocols may be used together or separately. The request may also be sent by means of SIP. The packets may be transported based on, for example, the User Datagram Protocol (UDP) or Transport Control Protocol (TCP).

The "always on" session enables the mobile station to know to which IP address and port of the PoC application server the RTP/RTCP packets shall be directed. RTP/RTCP payload includes sufficient addressing information for routing of the RTP/RTCP packets to the B-party mobile station 44.

The B-party may need to be identified for the PoC server when the request for speech connection is eventually made. The user may select the B-party user or target group from the menu of the mobile station, and then press the "push to talk" key on the mobile station. The required identity information may be added by the mobile station to the signaling transported on the "always on" session to the PoC application server.

In accordance with another embodiment information associated with the capabilities of the application server is provided for the user equipment and stored therein for further use. It is also possible that the user equipment and the application server exchange required capability information with each other at step 102 of FIG. 2 before a request is made for a communication session.

In accordance with an embodiment a user equipment sends information regarding the capabilities that could be used. The application server receives the capability information and treats this information as a proposal. After having analyzed the capabilities, the application server may then send back information about capabilities that shall be used for the next session. The analysis and decision making in this regard may be based on various information. For example, if a group session is to be set up, the application server may analyze the capabilities of all user equipment involved in the session, and set the capabilities such that all members of the group can participate the session.

The above describes a general application server based solution for a time critical service like the PoC. However, it shall be appreciated that the invention may be applied to other services without departing from the spirit and scope thereof.

The concept offers terminal manufacturers an opportunity to implement the push-to-talk facility across user equipment categories, thus offering end-users more freedom to choose products that best meet their communication needs.

It should be appreciated that while embodiments of the invention have been described in relation to user equipment such as mobile stations, embodiments of the invention are applicable to any other suitable type of user equipment.

The examples of the invention have been described in the context of an IMS system and GPRS networks. This invention is also applicable to any other access techniques. Furthermore, the given examples are described in the context of SIP networks with SIP capable entities. This invention is also applicable to any other appropriate communication systems, either wireless or fixed line systems and standards and protocols.

It shall be appreciated that although FIG. 1 shows and the above describes only one PoC application server, a number of such servers may be provided. The A- and B-party user equipment may be registered with different PoC application servers. The applications servers serving the A- and B-parties may even be located in different networks.

The embodiments of the invention have been discussed in the context of call state control functions. Embodiments of the invention can be applicable to other network elements where applicable.

It is also noted herein that while the above describes exemplifying embodiments of the invention there are several variations and modifications which may be made to the disclosed solution without departing from the scope of the invention as defined in the appended claims.

The invention claimed is:

1. A method comprising:
    registering at least one user equipment at a service provider;
    receiving, at the service provider from the at least one user equipment, information about media capabilities before a data session with the at least one user equipment is requested;
    storing the received information about the media capabilities;
    receiving, at the service provider, a request for the data session with the at least one user equipment; and
    using the stored information when setting up the requested data session, wherein the information about the media capabilities comprises information associated with available communication ports and codec capabilities, and wherein receiving the information about the media capabilities comprises receiving at least one session initiation protocol invite message from the at least one user equipment.

2. The method of claim 1, wherein the receiving the information about the media capabilities comprises receiving information about media capabilities of the at least one user equipment, and the storing the received information comprises storing the media capability information of the at least one user equipment at the service provider.

3. The method of claim 2, wherein the information about the media capabilities comprises information associated with at least one of: a mode capability; a type or a version of the user equipment; a timer; a supported optional feature; and a capability of the radio bearer provided for the user equipment.

4. The method of claim 1, further comprising sending the information about the media capabilities from the service provider to the at least one user equipment.

5. The method of claim 4, wherein the information about the media capabilities comprises information associated with at least one of: a version of an application server; a supported optional feature; a timer; an available service; and an account.

6. The method of claim 1, wherein the registering the user equipment comprises registering the user equipment with a push-to-talk service application server.

7. The method of claim 1, further comprising registering the user equipment with an internet protocol multimedia subsystem, and subsequent thereto registering the user equipment automatically with the service provider.

8. A method of claim 1, wherein the receiving the information about media capabilities comprises automatically receiving the information after the registration of the user equipment at the service provider.

9. The method of claim 1, wherein the registering the user equipment at the service provider comprises registering the user equipment by an internet protocol multimedia subsystem via a third party registration.

10. The method of claim 1, further comprising communication on a packet switched communication network.

11. The method of claim 10, wherein the data session comprises a packet data protocol context.

12. The method of claim 1, further comprising opening a substantially instant user plane communication session between the user equipment and the service provider in response to receiving a request for a session from another user equipment.

13. The method of claim 1, further comprising storing information about the media capabilities of at least two user equipments before receiving the request for the data session.

14. The method of claim 13, further comprising setting up a multi-user session based on the stored information.

15. The method of claim 1, further comprising
receiving from the user equipment information associated with the media capabilities the user equipment could provide in a communication session at the service provider to be established later;
analyzing, at the service provider, the information associated with the available media capabilities; and
sending from the service provider to the user equipment the information about the media capabilities for use by the user equipment in the later communication session.

16. A method comprising:
sending a registration request from at least one user equipment to a service provider;
sending, from the at least one user equipment, information about media capabilities to the service provider before a data session with the at least one user equipment is requested at the service provider,
wherein the information about the media capabilities comprises information associated with available communication ports and codec capabilities, and wherein sending the information about the media capabilities comprises sending at least one session initiation protocol invite message from the user equipment.

17. The method of claim 16, wherein the information about the media capabilities comprises information associated with at least one of: a mode capability; a type or a version of the at least one user equipment; a timer; a supported optional feature; a capability of the radio bearer provided for the at least one user equipment.

18. The method of claim 16, wherein the sending the registration request comprises sending the registration request to a push-to-talk service application server.

19. The method as of claim 16, further comprising sending another registration request to an internet protocol multimedia subsystem, for subsequent registering automatically with the service provider.

20. The method of claim 16, further comprising communication on a packet switched communication network.

21. The method of claim 20, wherein the data session comprises a packet data protocol context.

22. The method of claim 16, further comprising opening a substantially instant user plane communication session between the at least one user equipment and the service provider in response to receiving another request for a session from another user equipment.

23. The method of claim 16, further comprising sending from the user equipment information associated with the media capabilities the user equipment could provide for a communication session to be established later, and receiving from the service provider the information about the media capabilities for use by the user equipment in the later communication session.

24. A communication system comprising:
a communication network for providing at least one user equipment with access to at least one data network;
a data network connected to the communication network; and
an application server connected to the data network, wherein the application server is configured to
receive information about media capabilities from at least one user equipment before a data session with the at least one user equipment is requested, and
store information about the media capabilities in a storage and to use information from the storage when setting up a requested data session, wherein the information the about media capabilities comprises information associated with available communication ports and codec capabilities, and wherein the receiving the information about the media capabilities comprises receiving at least one session initiation protocol invite message from the at least one user equipment.

* * * * *